United States Patent
Brossard

(10) Patent No.: US 10,207,952 B2
(45) Date of Patent: Feb. 19, 2019

(54) GLAZING COMPRISING A SUBSTRATE COATED WITH A STACK COMPRISING A FUNCTIONAL LAYER MADE FROM SILVER AND A THICK BLOCKING UNDERLAYER MADE FROM $TIO_x$

(71) Applicant: SAINT-GOBAIN GLASS FRANCE, Courbevoie (FR)

(72) Inventor: Sophie Brossard, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/036,478

(22) PCT Filed: Nov. 14, 2014

(86) PCT No.: PCT/FR2014/052915
§ 371 (c)(1),
(2) Date: May 13, 2016

(87) PCT Pub. No.: WO2015/071610
PCT Pub. Date: May 21, 2015

(65) Prior Publication Data
US 2016/0297709 A1    Oct. 13, 2016

(30) Foreign Application Priority Data
Nov. 15, 2013    (FR) ..................... 13 61189

(51) Int. Cl.
*B32B 15/04*    (2006.01)
*B32B 17/06*    (2006.01)
(Continued)

(52) U.S. Cl.
CPC ............ *C03C 17/366* (2013.01); *C03C 17/36* (2013.01); *C03C 17/3618* (2013.01);
(Continued)

(58) Field of Classification Search
USPC ........ 428/426, 428, 432, 433, 434, 688, 689, 428/697, 698, 699, 701, 702
See application file for complete search history.

(56) References Cited

U.S. PATENT DOCUMENTS

| 6,602,587 B2 * | 8/2003 | Macquart .......... B32B 17/10174 359/359 |
| 2009/0176086 A1 * | 7/2009 | Martin .............. B32B 17/10174 428/332 |
| 2011/0027562 A1 * | 2/2011 | Di Stefano ............. C03C 17/36 428/216 |

FOREIGN PATENT DOCUMENTS

| EP | 0 219 273 A2 | 4/1987 |
| EP | 0 678 484 A2 | 10/1995 |

(Continued)

OTHER PUBLICATIONS

International Search Report as issued in International Patent Application No. PCT/FR2014/052915, dated Mar. 5, 2015.

*Primary Examiner* — Lauren R Colgan
(74) *Attorney, Agent, or Firm* — Pillsbury Winthrop Shaw Pittman LLP

(57) ABSTRACT

A glazing includes a transparent substrate coated with a stack of thin layers including at least one silver-based functional metal layer and at least two antireflective coatings, each antireflective coating including at least one dielectric layer, so that each functional metal layer is positioned between two antireflective coatings. The stack includes at least one antireflective coating including a dielectric layer capable of generating defects of hole type and at least one blocking layer based on titanium oxide exhibiting a thickness of greater than 1 nm, the blocking layer being located between the antireflective coating including a dielectric layer capable of generating defects of hole type and a silver-based functional metal layer, imme- (Continued)

diately in contact with the silver-based functional metal layer.

16 Claims, 5 Drawing Sheets

(51) Int. Cl.
    *C03C 17/36*     (2006.01)
    *E06B 9/24*     (2006.01)

(52) U.S. Cl.
    CPC ...... *C03C 17/3626* (2013.01); *C03C 17/3644* (2013.01); *C03C 17/3652* (2013.01); *C03C 17/3681* (2013.01); *E06B 9/24* (2013.01); *C03C 2217/212* (2013.01); *C03C 2217/216* (2013.01); *C03C 2217/256* (2013.01); *C03C 2217/281* (2013.01); *C03C 2217/73* (2013.01); *E06B 2009/2417* (2013.01)

(56) References Cited

FOREIGN PATENT DOCUMENTS

| WO | WO 2007/054656 A1 | 5/2007 |
|----|-------------------|--------|
| WO | WO 2009/115595 A1 | 9/2009 |
| WO | WO 2010/103224 A1 | 9/2010 |
| WO | WO 2012/115850 A1 | 8/2012 |

* cited by examiner

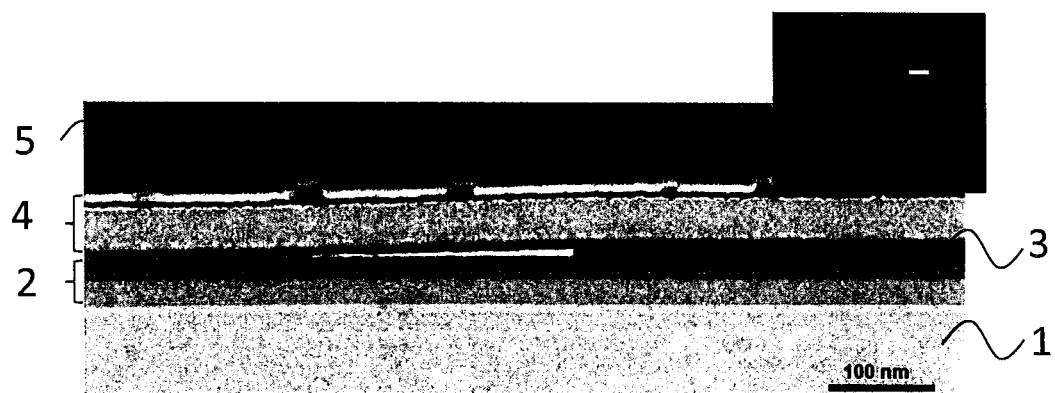
Figure 1.a
Figure 1.b
Figure 2

GLAZING COMPRISING A SUBSTRATE COATED WITH A STACK COMPRISING A FUNCTIONAL LAYER MADE FROM SILVER AND A THICK BLOCKING UNDERLAYER MADE FROM TIO$_x$

CROSS-REFERENCE TO RELATED APPLICATIONS

This application is the U.S. National Stage of PCT/FR2014/052915, filed Nov. 14, 2014, which in turn claims priority to French Application No. 1361189, filed Nov. 15, 2013. The contents of all of these applications are incorporated herein by reference in their entirety.

The invention relates to a glazing comprising a transparent substrate coated with a stack of thin layers comprising at least one silver-based functional metal layer.

Silver-based functional metal layers (or silver layers) have advantageous properties of electrical conduction and of reflection of infrared (IR) radiation, hence their use in "solar control" glazings targeted at reducing the amount of solar energy entering and/or in "low-e" glazings targeted at reducing the amount of energy dissipated towards the outside of a building or vehicle.

These silver layers are deposited between antireflective coatings which generally comprise several dielectric layers making it possible to adjust the optical properties of the stack. In addition, these dielectric layers make it possible to protect the silver layer from chemical or mechanical attacks.

The optical and electrical properties of glazings depend directly on the quality of the silver layers, such as their crystalline state, their homogeneity and their environment, such as the nature and the surface roughness of the interfaces above and below the silver layer.

It is known, in order to improve the quality of silver-based functional metal layers, to use blocking layers, the role of which is to protect these layers from possible damage related to the deposition of an antireflective coating or related to a heat treatment. Numerous possibilities, varying in particular in the nature, the number and the position of said blocking layers, have been provided.

For example, it is possible to use a blocking layer or blocking coating composed of several blocking layers. These blocking layers or coatings can be located solely above, solely below or both above and below the functional layer.

The choice of the nature and of the thickness of the blocking layers depends on the materials making up the functional layer, on the materials making up the antireflective coatings located in contact with the functional layer, on the possible heat treatments and on the properties desired.

The complexity of the stacks and also the diversity of the treatments and properties desired make it necessary to adjust the characteristics of the blocking layer to each configuration.

Mention may be made, among the blocking layers conventionally used, of blocking layers based on a metal chosen from niobium Nb, tantalum Ta, titanium Ti, chromium Cr or nickel Ni or based on an alloy obtained from at least two of these metals, in particular on an alloy of nickel and chromium (Ni/Cr).

Blocking layers based on an alloy of nickel and chromium make it possible to reduce the haze and to improve the mechanical properties after heat treatment of tempering type. However, the presence of these layers damages the emissivity, the absorption of the stack and the conductivity by promoting in particular the scattering of the electrons.

These layers also weaken the beneficial effect related to the presence of a stabilizing layer intended to promote the crystallization of the silver, such as a layer of zinc oxide, when these blocking layers are inserted between the stabilizing layer and the silver layer.

The invention very particularly relates to a glazing which has to undergo a high-temperature heat treatment, such as an annealing, a bending and/or a tempering. In point of fact, high-temperature heat treatments can cause modifications within the silver layer and in particular generate defects. Some of these defects exist in the hole or dome form.

The defects of "hole" type correspond to the appearance of regions devoid of silver exhibiting a circular or dendritic shape, that is to say to a partial dewetting of the silver layer. The silver layer, after heat treatment, is a silver layer comprising holes of circular or dendritic shape corresponding to silver-free regions. The silver layer observed with a microscope appears flat. The thickness of this layer, taken at the regions with silver, does not vary by very much.

The defects of "dome" type correspond to the presence of "large" silver grains which cause variations in thickness within the silver layer, that is to say thickened regions and thinned regions. The variation in thickness can be pointwise, that is to say observed solely at said "large" grains. The silver layer can then have a homogeneous thickness except at the "large" grains. The variation in thickness can be more extensive as a result of a rearrangement of the silver layer around said "large" grains. These defects of "dome" type do not correspond to an intermediate state of defects of "hole" type.

FIG. 1.a is an image in section taken with a transmission microscope of a defect of hole type. FIG. 1.b is an image taken with a scanning electron microscope which locates, by the white line, the section of FIG. 1.a.

FIG. 2 is an image in section taken with a transmission microscope of a defect of dome type.

In these images, the glass substrate 1, the antireflective coating 2 comprising several dielectric layers located below the silver layer, the silver layer 3, the antireflective coating 4 located above the silver layer and a protective layer 5 are made out.

These images clearly show the difference between defects of hole type and of dome type.

The presence of defects generates light scattering phenomena which are reflected visually by the appearance of a luminous halo known as "haze", generally visible under intense light. The haze corresponds to the amount of the transmitted light which is scattered at angles of more than 2.5°.

The presence of these defects also appears to generate a decrease in the conductivity and in the mechanical strength and the appearance of points of corrosion. These points of corrosion are often visible even in normal light.

The reasons and mechanisms for the formation of these defects are still poorly understood. The occurrence of defects of hole or dome type appears to be strongly dependent on the nature of the dielectric layers making up the antireflective coatings located above and below the silver layer. The presence of certain dielectric materials in the stack, in particular certain oxides, increases the formation of certain defects (hole or dome).

The applicant has discovered that the presence of a dielectric layer based on titanium oxide ($TiO_2$), on niobium oxide ($Nb_2O_5$) or on tin oxide ($SnO_2$) in antireflective coatings promotes the formation of defects of hole type during a high-temperature heat treatment. In point of fact, these materials are optically advantageous materials, in particular titanium dioxide because of its high refractive index. It is known, for example from the applications EP 678 484 and EP 2 406 197, that one or more dielectric layers having a high refractive index, positioned between the substrate and the functional metal layer, can make it possible to render the functional metal layer antireflective. A solution targeted at not using this type of high index material in antireflective coatings is not satisfactory.

The applicant has discovered that the presence of a dielectric layer based on zinc tin oxide (SnZnO) in antireflective coatings promotes the formation of defects of dome type.

Finally, the applicant has discovered that the presence of a dielectric layer based on silicon nitride optionally doped with aluminum generates far fewer defects of hole type or of dome type.

The application WO 2007/054656 discloses a glazing comprising a transparent substrate coated with a stack of thin layers comprising a silver-based functional metal layer and a blocking layer based on titanium oxide. The blocking layer exhibits a thickness preferably of between 0.5 and 2 nm. The antireflective coatings are composed of dielectric layers based on silicon nitride and zinc oxide. These dielectric layers do not have a tendency to form defects of hole or dome type in the silver-based functional layer subsequent to a heat treatment.

The objective of the invention is to develop a glazing comprising a substrate coated with a stack comprising at least one silver-based functional layer and at least one antireflective coating comprising a dielectric layer capable of generating defects of hole type in the silver-based functional layer. The glazing must be able to be subjected to high-temperature heat treatments of bending, tempering or annealing type while retaining its optical quality, its mechanical strength and its resistance to corrosion, despite the presence of the layer capable of generating holes. These advantageous properties must also be obtained without modifying the other properties expected for stacks comprising a silver layer, for example without significantly modifying the absorption, the emissivity and the resistivity.

A subject matter of the invention is a glazing comprising a transparent substrate coated with a stack of thin layers comprising at least one silver-based functional metal layer and at least two antireflective coatings, each antireflective coating comprising at least one dielectric layer, so that each functional metal layer is positioned between two antireflective coatings, characterized in that the stack comprises at least one antireflective coating comprising a dielectric layer capable of generating defects of hole type and at least one blocking layer based on titanium oxide exhibiting a thickness of greater than 1 nm, preferably of greater than 2 nm, the blocking layer being located between the antireflective coating comprising a dielectric layer capable of generating defects of hole type and a silver-based functional metal layer and immediately in contact with the silver-based functional metal layer.

The use of a blocking layer, preferably a thick blocking layer, based on titanium oxide in contact with the silver-based functional metal layer makes it possible to significantly prevent the dewetting and the appearance of defects of dendritic hole type in the silver layer when the substrate coated with the stack is subjected to a heat treatment of tempering type.

The solution of the invention is very particularly suitable in the case of a glazing, the antireflective coating comprising a dielectric layer capable of generating defects of hole type of which is located below a silver-based functional metal layer.

The invention also makes it possible to obtain superior performances, in particular a decrease in the haze, in the absorption in the visible region and the emissivity, and also a decrease in the display of scratches subsequent to a heat treatment. These advantageous results are observed in particular by a comparison with those obtained with stacks comprising a blocking layer of different nature, for example based on NiCr alloy, or with stacks not comprising a blocking layer.

BRIEF DESCRIPTION OF THE DRAWINGS

FIG. 1.*a* is an image in section taken with a transmission microscope of a defect of hole type;

FIG. 1.*b* is an image taken with a scanning electron microscope which locates, by the white line, the section of FIG. 1.*a*;

FIG. 2 is an image in section taken with a transmission microscope of a defect of dome type;

Figure 3:
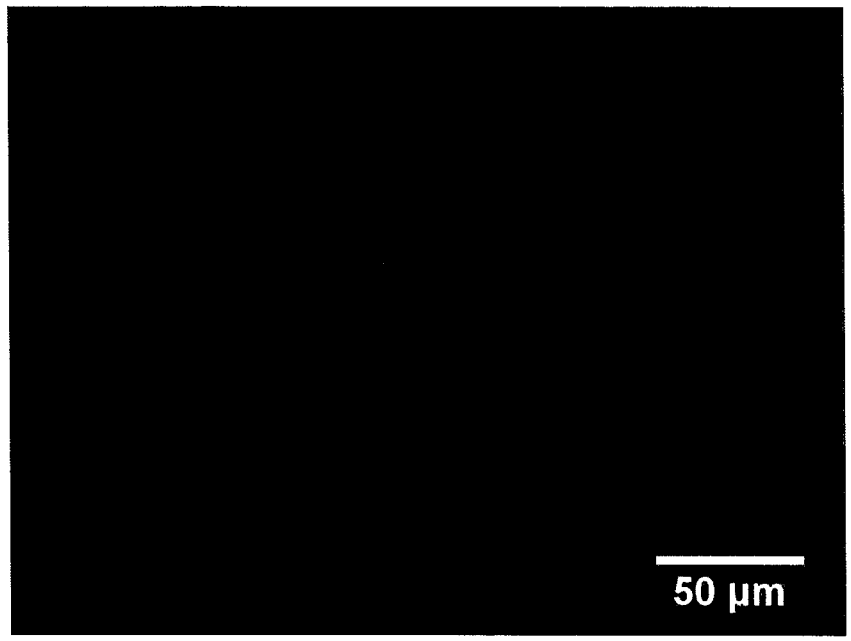
FIG. 3 is an image taken with an optical microscope of a substrate coated with a stack comprising a silver layer which has not been subjected to a heat treatment.

Unless otherwise mentioned, the thicknesses mentioned in the present document are physical thicknesses. The term "thin layer" is understood to mean a layer exhibiting a thickness of between 0.1 nm and 100 micrometers.

According to the invention, a transparent substrate coated with a stack of thin layers means that the stack has been deposited on the substrate by cathode sputtering.

According to the invention, the silver-based functional metal layer is directly in contact with a blocking layer. A blocking underlayer corresponds to a blocking layer positioned under a functional layer, which position is defined with respect to the substrate. A blocking layer positioned on the functional layer on the opposite side from the substrate is known as blocking overlayer.

The dielectric layers capable of generating defects of hole type can be identified by virtue of an optical microscopy analysis or a scanning electron microscopy analysis. For this, a dielectric layer is deposited on a substrate in contact with or close to a silver layer. The assembly is subjected to a heat treatment. Observation of the images makes it possible to identify if defects are generated. If appropriate, if these defects are of hole type or of dome type.

Dielectric layers chosen from layers based on titanium oxide ($TiO_2$), on niobium oxide ($Nb_2O_5$) and on tin oxide ($SnO_2$) are capable of generating defects of hole type.

A layer based on titanium oxide ($TiO_2$) comprises at least 95.0%, preferably at least 96.5% and better still at least 98.0% by weight of titanium oxide.

A layer based on niobium oxide ($Nb_2O_5$) comprises at least 95.0%, preferably at least 96.5% and better still at least 98.0% by weight of niobium oxide.

A layer based on tin oxide ($SnO_2$) comprises at least 95.0%, preferably at least 96.5% and better still at least 98.0% by weight of tin oxide.

The dielectric layer capable of generating defects of hole type is not merged with the blocking layer, that is to say that the dielectric layer capable of generating defects of hole type and the blocking layer are two separate layers. When the layer capable of generating defects of hole type is a $TiO_2$ layer, this layer is separated from the blocking layer by at least one layer of different nature.

The dielectric layers capable of generating defects of hole type exhibit a thickness of greater than 5 nm, preferably of between 8 and 20 nm.

The solution provided according to the invention is suitable when the dielectric layer capable of generating holes is sufficiently close to the silver-based functional layer to induce said defects. This is because, in the case of a complex stack comprising antireflective coatings with a certain number of dielectric layers, when the layer capable of generating defects of hole type is separated from the silver-based functional layer by a large thickness of one or more layers not capable of generating defects or capable of generating defects of dome type, the ability to generate defects of hole type is decreased, indeed even nullified.

The dielectric layer capable of generating defects of hole type of the antireflective coating is separated from the functional layer by one or more layers, the thickness of all the layers interposed between the layer capable of generating defects of hole type and the functional layer being at most 20 nm, preferably at most 15 nm.

According to an advantageous embodiment, the antireflective coating located below the silver-based functional metal layer comprises at least one dielectric layer having a stabilizing function immediately in contact with the blocking layer. This dielectric layer having a stabilizing function can be based on crystalline oxide, in particular based on zinc oxide, optionally doped using at least one other element, such as aluminum. The presence of this stabilizing layer, in particular located below the silver layer, contributes greatly to the good performances in terms of conductivity and of mechanical strength.

Contrary to all expectation, a synergistic effect is observed on the lowering of the haze values obtained after heat treatment, related to the joint presence, according to this sequence, of the stabilizing layer and of the blocking layer. The presence of a stabilizing layer located below the silver layer is an essential factor in reducing the haze. It is thus absolutely unforeseeable that a thick blocking layer deposited between the stabilizing layer and the functional layer results in a decrease in the haze. On the contrary, it would have been expected that the presence of such a layer would weaken, indeed even nullify, the action of the stabilizing layer.

The dielectric layer capable of generating defects of hole type of the antireflective coating is thus generally separated from the functional layer by at least the blocking layer and the stabilizing layer of the antireflective coating.

The dielectric layer capable of generating defects of hole type of the antireflective coating is separated from the functional layer by one or more layers, the thickness of all the layers interposed between the layer capable of generating defects of hole type and the functional layer being at least 6 nm, preferably at least 7.5 nm.

A glazing according to the invention exhibits a lower absorption, before and after a heat treatment of tempering type, than that of a glazing comprising a substrate coated with a stack with a blocking underlayer of NiCr type.

After heat treatment, the glazings according to the invention exhibit a significant decrease in their emissivity. The emissivity values are lower than those of a glazing comprising a substrate coated with a stack with a blocking underlayer based on NiCr. More surprisingly, the emissivity values are also lower than those of a glazing comprising a substrate coated with a stack without a blocking underlayer.

Tests have shown that the improvement in terms of haze contributed by the use of a blocking layer increases with the thickness of the blocking layer. These tests have consisted in evaluating the haze as a function of the thickness of the titanium oxide layer after heat treatment under conditions simulating those of a tempering. The haze values decrease when the thickness of the blocking layer increases. However, the titanium oxide is preferably slightly suboxidized and thus absorbent. Consequently, a compromise between the decrease in the haze and the increase in the absorption and in the resistivity has to be found in, for example by choosing a suitable thickness. The blocking layer based on titanium oxide exhibits a thickness of greater than 2.5 nm, preferably of between 2.5 and 4.5 nm.

The blocking layer can be completely oxidized in the $TiO_2$ form or partially suboxidized. When it is partially suboxidized, it is thus not deposited in the stoichiometric form but in a substoichiometric form, of the $TiO_x$ type, where x is a number different from the stoichiometry of titanium oxide $TiO_2$, that is to say different from 2 and preferably less than 2, in particular of between 0.75 times and 0.99 times the normal stoichiometry of the oxide. $TiO_x$ can in particular be such that $1.5<x<1.98$ or $1.5<x<1.7$, indeed even $1.7<x<1.95$.

The blocking layer is deposited from a ceramic $TiO_x$ target with x between 1.5 and 2, preferably in a nonoxidizing atmosphere (that is to say, without deliberate introduction of oxygen) preferably composed of noble gas(es) (He, Ne, Xe, Ar, Kr). This makes it possible to avoid problems of corrosion and of contamination of the silver layer.

Throughout the description, the substrate according to the invention is regarded as placed horizontally. The stack of thin layers is deposited above the substrate. The meaning of the expressions "above" and "below" and "lower" and "upper" is to be considered with respect to this orientation. If not specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

According to an advantageous embodiment, the stack can comprise:
  an antireflective coating comprising at least two dielectric layers, including a dielectric layer based on titanium oxide and a dielectric layer other than a layer based on titanium oxide separating the dielectric layer based on titanium oxide from a silver-based functional metal layer, a blocking layer based on titanium oxide exhibiting a thickness of at least 2 nm, preferably of at least 2.5 nm, a silver-based functional metal layer located immediately in contact with the blocking layer based on titanium oxide.

According to this embodiment, the stack can comprise:

an antireflective coating located below the silver-based functional metal layer comprising at least one dielectric layer based on titanium oxide and a dielectric layer having a stabilizing function based on zinc oxide separating the dielectric layer based on titanium oxide from the silver-based functional metal layer, a blocking layer based on titanium oxide exhibiting a thickness of at least 2 nm, located immediately in contact with the dielectric layer having a stabilizing function based on zinc oxide, a silver-based functional metal layer located immediately in contact with the blocking layer based on titanium oxide, optionally a blocking overlayer, an antireflective coating located above the silver-based functional metal layer, optionally an upper protective layer.

The thickness of the silver-based functional layers is, by increasing order of preference, of from 5 to 20 nm or from 8 to 15 nm.

The silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer.

The dielectric layers of the antireflective coatings can be chosen from oxides or nitrides of one or more elements chosen from titanium, silicon, aluminum, tin and zinc.

The antireflective coatings can comprise dielectric layers having a barrier function and/or dielectric layers having a stabilizing function.

The term "dielectric layers having a barrier function" is understood to mean a layer made of a material capable of forming a barrier to the diffusion of oxygen and water at high temperature, originating from the ambient atmosphere or from the transparent substrate, toward the functional layer. The dielectric layers having a barrier function can be based on silicon compounds chosen from oxides, such as $SiO_2$, silicon nitrides $Si_3N_4$ and oxynitrides $SiO_xN_y$, optionally doped using at least one other element, such as aluminum, based on aluminum nitrides AlN or based on zinc tin oxide.

The term "dielectric layers having a stabilizing function" is understood to mean a layer made of a material capable of stabilizing the interface between the functional layer and this layer. The dielectric layers having a stabilizing function are preferably based on crystalline oxide, in particular based on zinc oxide, optionally doped using at least one other element, such as aluminum. The dielectric layer or layers having a stabilizing function are preferably zinc oxide layers.

The final layer of each antireflective coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and enhances its quality and its stability at high temperature. It is also advantageous to have a layer having a stabilizing function, for example based on zinc oxide, above a functional layer.

The dielectric layer or layers having a stabilizing function can thus be found above and/or below at least one functional layer or each functional layer, either directly in contact with it or separated by a blocking layer. Preferably, each functional metal layer is above an antireflective coating, the upper layer of which is a dielectric layer having a stabilizing function, preferably based on zinc oxide, and/or below an antireflective coating, the lower layer of which is a dielectric layer having a stabilizing function, preferably based on zinc oxide.

This dielectric layer having a stabilizing function can have a thickness of at least 5 nm, in particular a thickness of between 5 and 25 nm and better still from 8 to 15 nm.

A particularly advantageous embodiment relates to a glazing comprising a substrate coated with a stack comprising, starting from the transparent substrate:

an antireflective coating comprising at least one dielectric layer having a barrier function and at least one dielectric layer having a stabilizing function, a blocking layer, a functional layer, an antireflective coating comprising at least one dielectric layer having a stabilizing function and a dielectric layer having a barrier function.

The stack can comprise an upper protective layer deposited as final layer of the stack, in particular in order to confer scratch-resistant properties. These upper protective layers are not regarded as included in an antireflective coating. These upper protective layers are separated from the functional layers at least by an antireflective coating, the thickness of which is generally greater than 20 nm. These layers are generally ultrathin and have in particular a thickness of between 2 and 5 nm.

The substrate can be made of any material capable of withstanding the high temperatures of the heat treatment. The transparent substrates according to the invention are preferably made of a rigid inorganic material, such as made of glass, in particular soda-lime-silica glass. The thickness of the substrate generally varies between 0.5 mm and 19 mm. The thickness of the substrate is preferably less than or equal to 6 mm, indeed even 4 mm.

The glazing comprising the substrate coated with the stack may have been subjected to a heat treatment at high temperature. The heat treatments are chosen from an annealing, for example from a flash annealing, such as a laser or flame annealing, a tempering and/or a bending. The heat treatment temperature is greater than 300° C., preferably greater than 400° C. and better still greater than 500° C.

The substrate coated with the stack can be is a bent and/or tempered glass. The glazing can be in the form of a monolithic glazing, of a laminated glazing, of an asymmetric glazing or of a multiple glazing, in particular a double glazing or triple glazing.

The glazing according to the invention can be a laminated glazing. In this case, the substrate comprises at least two rigid substrates of the glass type assembled by at least one thermoplastic polymer sheet, in order to exhibit a structure of glass/stack of thin layers/sheet(s)/glass type. The polymer can in particular be based on polyvinyl butyral PVB, ethylene-vinyl acetate EVA, polyethylene terephthalate PET or polyvinyl chloride PVC. In a laminated structure, the substrate coated with the stack can be in contact with the polymer sheet.

The invention also relates to a process for the manufacture of the substrate as defined above. According to this process, the stack of thin layers is deposited on the substrate by a vacuum technique of the cathode sputtering type, optionally assisted by a magnetic field, and the blocking layer is deposited from a ceramic target, in a nonoxidizing atmosphere.

EXAMPLES

Stacks of thin layers defined below are deposited on substrates made of clear soda-lime glass with a thickness of 2 or 4 mm.

For these examples, the conditions for deposition of the layers deposited by sputtering ("magnetron cathode" sputtering) are summarized in table 1 below.

The titanium oxide layers deposited as dielectric layer of the antireflective coating or as blocking layer can be completely or partially oxidized. For this, a ceramic target of substoichiometric $TiO_x$ is used and deposition is carried out either in an oxidizing atmosphere, in order to obtain a completely oxidized $TiO_2$ layer, or in an inert atmosphere, in order to obtain a substoichiometric layer.

For certain examples, the thicknesses of layers are varied by modifying the deposition power.

TABLE 1

|  | Targets employed | Deposition pressure (mbar) | Gas(es) | Index 550 nm |
|---|---|---|---|---|
| $Si_3N_4$ | Si:Al (92:8 weight %) | $1.5 \times 10^{-3}$ | Ar 47% - $N_2$ 53% | 2.00 |
| ZnO | Zn:Al (98:2 weight %) | $1.5 \times 10^{-3}$ | Ar 91% - $O_2$ 9% | 2.04 |
| NiCr | NiCr (80:20 at. %) | $8 \times 10^{-3}$ | 100% Ar | — |
| Ag | Ag | $8 \times 10^{-3}$ | 100% Ar | — |
| $TiO_x$ | $TiO_x$ | $1.5 \times 10^{-3}$ | 100% Ar | 2.5 to 3.5 |
| $TiO_2$ | $TiO_x$ | $1.5 \times 10^{-3}$ | Ar 88% - $O_2$ 12% | 2.32 |
| SnZnO | SnZn | $1.5 \times 10^{-3}$ | Ar 43% - $O_2$ 57% | 2.09 | at. = atomic

The tables below list the materials and the physical thicknesses in nanometers (unless otherwise indicated) of each layer or coating which makes up the stacks of the comparative examples and of the examples according to the invention as a function of their positions with respect to the substrate carrying the stack.

| Glazing | Layers | Cp. 1 | Cp. 1' | Cp. 2 | Cp. 3 | Cp. 3' | Cp. 4 | Cp. 5 | Cp. 6 |
|---|---|---|---|---|---|---|---|---|---|
| Protective layer | $TiO_2$ | 2 | 2 | 2 | 2 | 2 | 2 | 2 | 2 |
| Antireflective coating AR2 | $Si_3N_4$ | 50 | 50 | 50 | 50 | 50 | 50 | 50 | 50 |
|  | ZnO | 5 | 5 | 5 | 5 | 5 | 5 | 5 | 5 |
| Blocking layer OB | NiCr | 0.5 | 0.5 | 0.5 | 0.5 | 0.5 | 0.5 | 0.5 | 0.5 |
| Functional layer | Ag | 11.5 | 11.5 | 10 | 11.5 | 11.5 | 11.5 | 11.5 | 11.5 |
| Blocking layer UB | NiCr | — | 0.5 | — | — | 0.5 | — | — | — |
| Antireflective coating AR1 | ZnO | 5 | 5 | 5 | 5 | 5 | 5 | 5 | 5 |
|  | $Si_3N_4$ | — | — | — | — | — | — | 30 | 10 |
|  | $TiO_2$ | — | — | — | 20 | 20 | 20 | 20 | 20 |
|  | $Si_3N_4$ | 25 | 25 | — | 25 | 25 | — | — | 25 |
|  | $SnZnO_x$ | — | — | 30 | — | — | — | — | — |
| Substrate (mm) | glass | 4 | 4 | 4 | 4 | 4 | 4 | 4 | 4 |
| FIG. |  | — | 4 | 5 | 6 | 7 | 8 | — | — |

| Glazing | Layers | Ex. 1 | Ex. 2 | Ex. 3 | Ex. 4 | Ex. 5 |
|---|---|---|---|---|---|---|
| Protective layer | $TiO_2$ | 2 | 2 | 2 | 2 | 2 |
| Antireflective coating AR2 | $Si_3N_4$ | 50 | 50 | 50 | 50 | 44 |
|  | ZnO | 5 | 5 | 5 | 5 | 5 |
| Blocking layer OB | NiCr | 0.5 | 0.5 | 0.5 | 0.5 | 0.5 |
| Functional layer | Ag | 11.5 | 11.5 | 11.5 | 11.5 | 11.5 |
| Blocking layer UB | $TiO_x$ | 1.5 | 3 | 6 | — | 3 |
|  | $TiO_2$ | — | — | — | 2 | — |
| Antireflective coating AR1 | ZnO | 5 | 5 | 5 | 5 | 5 |
|  | $TiO_2$ | 20 | 20 | 20 | 20 | 20 |
|  | $Si_3N_4$ | 25 | 25 | 25 | 25 | 18 |
|  | $SnZnO_x$ | — | — | — | — | — |
| Substrate (mm) | glass | 4 | 4 | 4 | 4 | 4 |

| Glazing | Layers | A | B | C |
|---|---|---|---|---|
| Protective layer | $TiO_2$ | 2 | 2 | 2 |
| Antireflective coating AR2 | $Si_3N_4$ | 40 | 40 | 40 |
|  | ZnO | 5 | 5 | 5 |
| Blocking layer OB1 | NiCr | 1 | 1 | 1 |
| Functional layer | Ag | 10 | 10 | 10 |
| Blocking layer UB | $TiO_x$ | — | 4 | 4 |
|  | $TiO_2$ | — | — | — |
| Antireflective coating AR1 | ZnO | 5 | — | 5 |
|  | $Si_3N_4$ | — | — | — |
|  | $TiO_2$ | 10 | 10 | 10 |
|  | $Si_3N_4$ | 25 | 25 | 25 |
| Substrate (mm) | glass | 4 | 4 | 4 |

The glazings A, B and C were subjected to a heat treatment in a Naber furnace simulating a tempering with an annealing at 620° C. for 10 minutes.

The other substrates coated with the stacks were subjected to a heat treatment in a tempering furnace.

I. Microscopic Observations

The morphology of the layers is analyzed by optical microscopy and by scanning electron microscopy. These tests demonstrate the different defects generated as a function of the nature of the dielectric layers in the antireflective coating under the silver layer.

The presence of defects after heat treatment can be quantified by measuring the proportion of surface area comprising defects on the thermally treated glazings. The measurement consists in determining the percentage of surface area occupied by the holes.

FIG. 3 is an image taken with an optical microscope of a substrate coated with a stack comprising a silver layer which has not been subjected to a heat treatment. No defect can be observed. All the other images were all taken after a heat treatment. The images taken with an optical microscope of the different glazings and also the area occupied by said defects are summarized in the table below.

Figure 4:
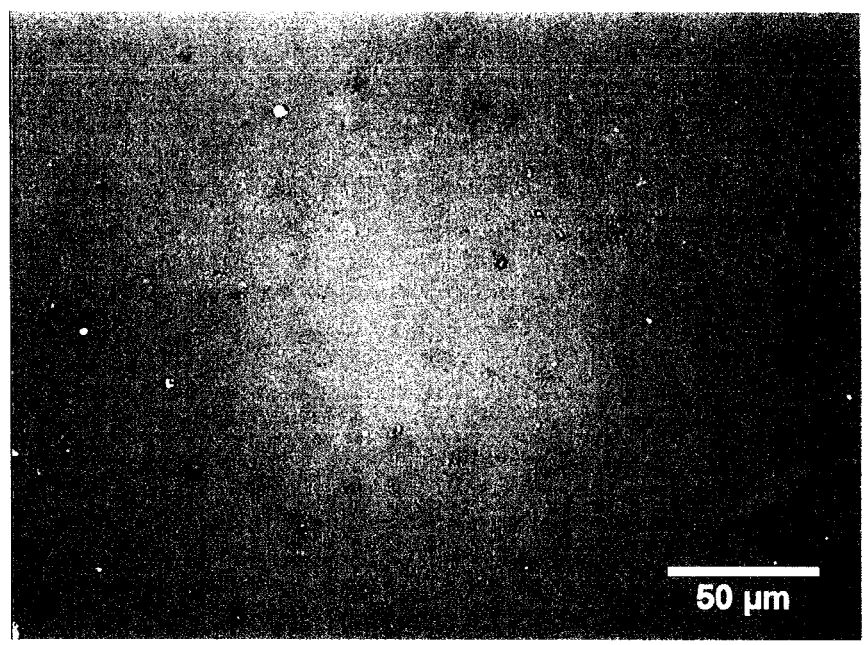
FIG. 4 illustrates a glazing not comprising layers capable of generating defects of dome type or of hole type according to an embodiment of the invention without NiCr underblocker.
Figure 5:
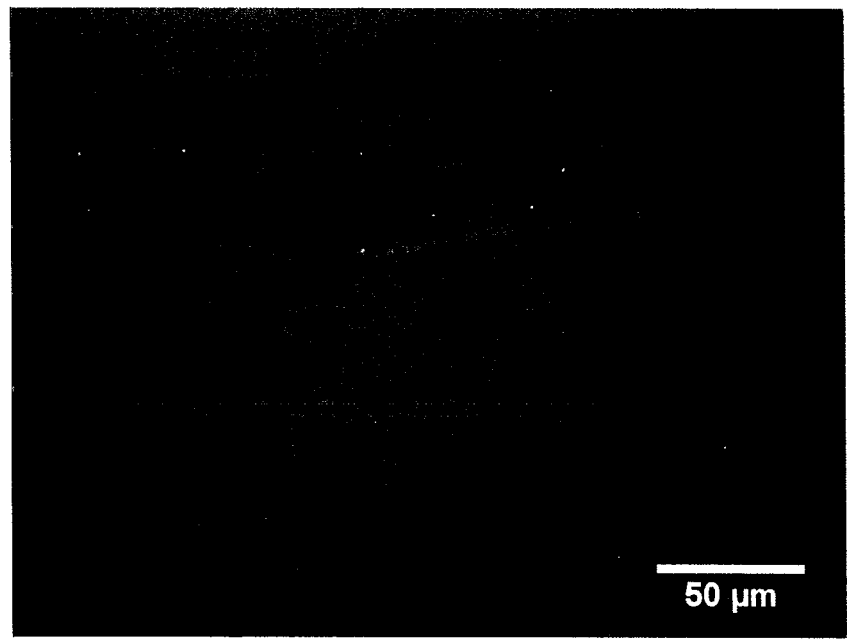
FIG. 5 illustrates a glazing not comprising layers capable of generating defects of dome type or of hole type according to an embodiment of the invention with NiCr underblocker.
Figure 6:
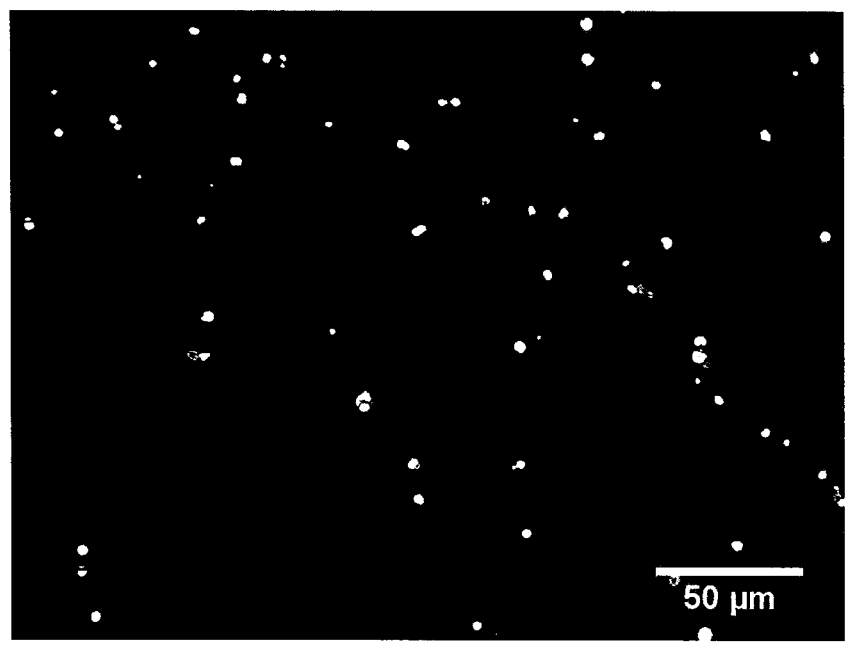
FIG. 6 is an image of a glazing comprising a stack comprising a layer capable of generating defects of dome type.
Figure 7:
FIG. 7 is an image of a glazing comprising a stack comprising a layer capable of generating defects of hole type without underblocker.
Figure 8:
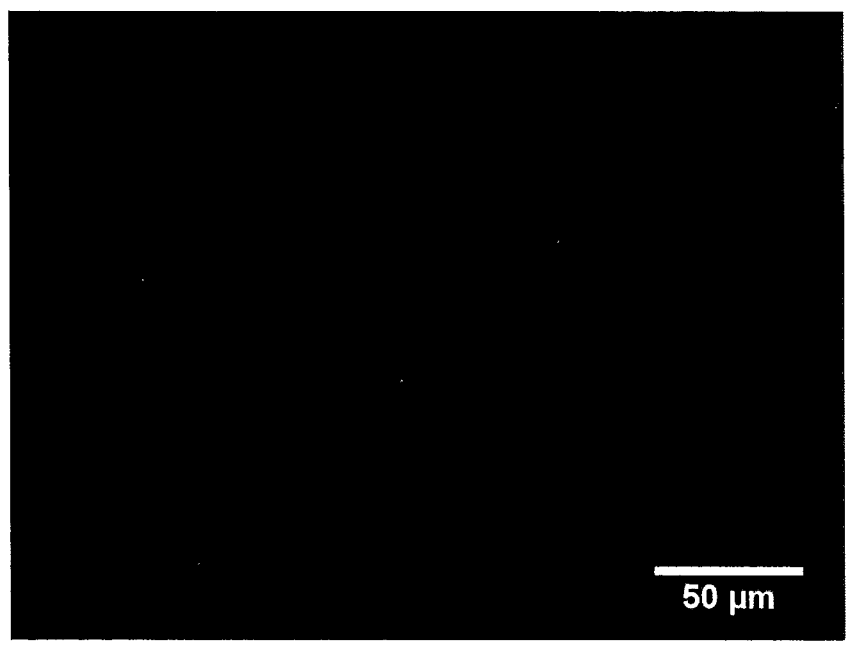
FIG. 8 is an image of a glazing comprising a stack comprising a layer capable of generating defects of hole type with NiCr underblocker.
Figure 9:
FIG. 9 is an image of a glazing according to an embodiment of the invention comprising a stack comprising a layer capable of generating defects of hole type with a $TiO_x$ underblocker.

| FIG. | Glazing | Area of the defects of hole type |
|---|---|---|
| FIG. 4 | Cp. 1 | 0.04% |
| FIG. 5 | Cp. 1' | 0.02% |
| FIG. 6 | Cp. 2 | — |
| FIG. 7 | Cp. 3 | 8.03% |
| FIG. 8 | Cp. 3' | 2.90% |
| FIG. 9 | Ex. 2 | 1.57% |

FIGS. 4 and 5 illustrate two glazings not comprising layers capable of generating defects of dome type or of hole type according to the invention without NiCr underblocker (FIG. 4) and with NiCr underblocker (FIG. 5). It is observed, on these images, that there are few defects of hole or dome type after heat treatment.

FIG. 6 is an image of a glazing comprising a stack comprising a layer capable of generating defects of dome type. The glazing of FIG. 6 differs from the glazing of FIG. 4 solely by the presence of a zinc tin oxide layer in place of the silicon nitride layer in the antireflective coating located below the silver-based functional layer. The image of FIG. 6 does not comprise blemishes of dendritic shape characteristic of the defects of hole type.

FIGS. 7 and 8 are images of glazings comprising a stack comprising a layer capable of generating defects of hole type without underblocker (FIG. 7) and with NiCr underblocker (FIG. 8). The black blemishes of dendritic shape correspond to the silver-free regions, that is to say to the defects of hole type obtained after tempering.

The glazings Cp.3 and Cp.3' illustrated by FIGS. 7 and 8 differ from the glazings Cp.1 and Cp.1' by the presence of a 10 nm titanium oxide layer between the layer having a stabilizing function of zinc oxide and the barrier layer of silicon nitride in the antireflective coating located below the silver-based functional layer. The comparative glazing Cp.3 does not comprise a blocking underlayer and the comparative glazing Cp.3' comprises a blocking underlayer based on NiCr. These comparative examples clearly show that the nature of the dielectric layers of the antireflective coating influences the presence and the type of defects generated in the silver layers.

FIG. 9 is an image of a glazing according to the invention comprising a stack comprising a layer capable of generating defects of hole type with a $TiO_x$ underblocker. The solution of the invention does not bring about the complete disappearance of the defects of hole type generated subsequent to a heat treatment when the stack comprises a layer capable of generating defects of hole type. However, their decrease is significant with in particular a proportion of surface comprising defects of less than 2%.

II. Diffuse Reflection and Assessment of the Decrease in the Number of Defects

The haze was evaluated by measurement of the mean visible diffuse reflection with a Perkin-Elmer L900 spectrometer. The measurement consists in taking the mean of the diffuse part of the reflection over the visible region, excluding the specular reflection from the measurement and subtracting the base line taken with regard to a nonhaze reference sample. It is expressed as a percentage with respect to a total reflection measured with regard to a reference mirror. The results obtained are taken up in the table below.

A correlation exists between the percentage of surface area occupied by the holes and the level of haze.

In order to be able to assess the decrease in the number of defects, the Δ defect/Ref (Cp.3), corresponding to the variation in the number of defects with respect to the comparative glazing comprising a stack without a blocking underlayer (Cp.3) taken as reference, was calculated. The Δ defect/Cp.3', corresponding to the variation in the number of defects with respect to the comparative glazing comprising a stack with a NiCr blocking underlayer (Cp.3'), was also calculated.

These values and the values for diffuse reflection and the area as a percentage of defects are summarized in the table below.

| Glazing | Area of the defects | Diffuse reflection | Δ defect/ Ref (Cp. 3) | Δ defect/ Cp. 3' |
|---|---|---|---|---|
| Cp. 1 | 0.04% | 0.04% | — | — |
| Cp. 1' | 0.02% | 0.06% | — | — |
| Cp. 3 | 8.03% | 2.21% | — | — |
| Cp. 3' | 2.90% | 0.26% | −65% | — |
| Cp. 4 | ≈4.3% | 1.66% | — | — |
| Cp. 5 | ≈0.3% | 0.11% | — | — |
| Cp. 6 | ≈0.2% | 0.03% | — | — |
| Ex. 1 | ≈1.8% | 0.68% | −77% | −38% |
| Ex. 2 | 1.57% | 0.43% | −81% | −46% |
| Ex. 3 | ≈0.8% | 0.17% | −89% | −72% |
| Ex. 4 | ≈1.8% | 0.36% | −77% | −38% |
| Ex. 5 | ≈1.2% | 0.35% | −85% | −59% |

These examples confirm that glazings comprising stacks without an antireflective coating comprising layers capable of generating holes comprise few defects subsequent to the heat treatment and a low haze (Cp.1 and Cp.1').

The glazings according to the invention comprising a blocking underlayer based on titanium oxide comprise fewer defects after heat treatment and a lower haze. The greater the thickness of the blocking underlayer, the better the improvement in these properties, absence of defects and decrease in the haze. These results illustrate the significant improvement in terms of decrease in the haze contributed by the solution of the invention.

These comparisons also demonstrate that a thick blocking underlayer of titanium oxide makes it possible to reduce the number of defects of hole type subsequent to a heat treatment more effectively than an underlayer based on a NiCr alloy when the stack comprises an antireflective coating comprising a layer capable of generating holes.

The comparative glazings Cp.4, Cp.5 and Cp.6 comprise complex stacks comprising antireflective coatings varying in particular in the position within the antireflective coating of the layer capable of generating defects of hole type. It is found that the ability to generate defects of hole type is decreased, indeed even nullified, when the layer capable of generating holes is sufficiently distanced from the silver layer by a significant thickness of one or more layers less capable of generating defects, such as $Si_3N_4$ layers (Cp.5 and Cp.6).

The solution provided according to the invention is more particularly suitable when the dielectric layer capable of generating holes is sufficiently close to the silver-based functional layer to induce said defects.

III. Optical Properties

The optical characteristics were measured for double glazings having the structure: glass of 6 mm/inserted space of 16 mm filled with 90% argon/glass of 4 mm, the stack being positioned on face 2 (the face 1 of the glazing being the outermost face of the glazing, as normal).

The emissivity values as a percentage ($\in$), calculated according to the standard EN 12898, and also the absorption values (Abs) and solar factor values (g), measured according to the standard EN 410, before and after tempering, are combined in the table below.

|  | Before tempering | | | After tempering | | |
|---|---|---|---|---|---|---|
|  | ε | Abs | g | ε | Abs | g |
| Cp. 3 | 5.6% | 7.6% | 63.5% | 5.1% | 6.8% | 60.2% |
| Cp. 3' | 6.7% | 9.3% | 63.1% | 5.1% | 7.5% | 62.0% |
| Cp. 5 | 5.5% | 9.2% | 60.9% | 4.5% | 6.5% | 60.8% |
| Cp. 6 | 5.8% | 8.5% | 62.4% | 4.9% | 8.1% | 61.3% |
| Ex. 1 | 6.1% | 8.0% | 63.3% | 4.6% | 6.7% | 62.2% |
| Ex. 2 | 6.5% | 8.4% | 63.4% | 4.6% | 6.6% | 62.4% |
| Ex. 3 | 6.6% | 8.8% | 63.3% | 4.6% | 6.8% | 62.6% |
| Ex. 4 | 6.2% | 8.5% | 63.6% | 4.5% | 6.7% | 62.5% |
| Ex. 5 | 6.2% | 8.8% | 64.5% | 4.1% | 6.9% | 63.2% |

The addition of a blocking underlayer brings about an increase in the emissivity before tempering as this layer, whatever its nature, disrupts the epitaxial growth of the silver.

The presence of the thick blocking underlayer according to the invention brings about an increase in the emissivity before tempering, in comparison with a stack not comprising a blocking underlayer, but this increase is lower than that obtained with other blocking underlayers.

After heat treatment, the glazing according to the invention exhibits a significantly lower emissivity than a glazing without a blocking underlayer and than a glazing comprising a blocking underlayer based on NiCr. The obtaining of a low emissivity accounts for a reduction in the energy losses by radiation and thus for an improvement in the thermal performance of the double glazing.

This is because the glazing Cp.3' comprising a layer capable of generating defects of hole type and a NiCr underblocker exhibits correct haze values but does not exhibit the advantageous properties of the invention in terms of emissivity, absorption and solar factor.

The solution of the invention thus makes it possible to significantly decrease the haze while also decreasing the emissivity and while increasing the solar factor.

IV. Evaluation of the Synergy between the Stabilizing Layer and the Blocking Layer The haze was evaluated by measuring the mean visible diffuse reflection with a Perkin-Elmer L900 spectrometer.

| Glazing | Haze | ΔHaze/Ref |
|---|---|---|
| A | 0.20% | — |
| B | 0.30% | +50% |
| C | 0.02% | −90% |

The ΔHaze/Ref corresponds to the variation in haze with respect to the comparative glazing A not comprising a blocking underlayer.

These tests demonstrate that the presence of the stabilizing layer is essential in order to obtain low haze values. However, contrary to all expectation, a synergistic effect on the falls in the haze values is observed related to the joint presence, according to this sequence, of the stabilizing layer and of the blocking underlayer. This is because it is absolutely unforeseeable for a thick blocking underlayer deposited between the stabilizing layer and the functional layer to result in a decrease in the haze and a fortiori in a fall of 90% with respect to a glazing not comprising a blocking layer. On the contrary, it would have been expected that the presence of such a layer would block the action of the stabilizing layer.

These results demonstrate that the presence of a thick blocking underlayer above a stabilizing layer makes possible a significant decrease in the haze after heat treatment of tempering type.

The invention claimed is:

1. A glazing comprising
   a transparent substrate coated with a stack of thin layers comprising at least one silver-based functional metal layer and at least two antireflective coatings, each antireflective coating comprising at least one dielectric layer, so that each functional metal layer is positioned between two antireflective coatings, wherein the stack comprises:
   at least one antireflective coating comprising a dielectric layer capable of generating defects of hole type, the dielectric layer being selected from the group consisting of titanium oxide that comprises at least 95.0% by weight of titanium dioxide, niobium oxide that comprises at least 95.0% by weight of niobium oxide, the antireflective coating being located below a silver-based functional metal layer, and
   at least one dielectric layer having a stabilizing function based on zinc oxide,
   at least one blocking layer based on titanium oxide exhibiting a thickness of greater than 2.5 nm, the blocking layer being located between the antireflective coating comprising a dielectric layer capable of generating defects of hole type and a silver-based functional metal layer, and immediately in contact with the dielectric layer having a stabilizing function,
   the dielectric layer capable of generating defects of hole type having a thickness of greater than 5 nm and being separated from the functional layer by one or more layers, the thickness of the one or more layers interposed between the layer capable of generating defects of hole type and the functional layer being at most 20 nm.

2. The glazing as claimed in claim 1, wherein the dielectric layer capable of generating defects of hole type of the antireflective coating is separated from the functional layer by one or more layers, the thickness of the one or more layers interposed between the layer capable of generating defects of hole type and the functional layer being at least 6 nm.

3. The glazing as claimed in claim 2, wherein the thickness of the one or more layers interposed between the layer capable of generating defects of hole type and the functional layer is at least 7.5 nm.

4. The glazing as claimed in claim 1, wherein the blocking layer based on titanium oxide exhibits a thickness of between 2.5 and 4.5 nm.

5. The glazing as claimed in claim 1, wherein the blocking layer based on titanium oxide is deposited from a ceramic $TiO_x$ target with x between 1.5 and 2, in a nonoxidizing atmosphere.

6. The glazing as claimed in claim 1, wherein the antireflective coating located below the silver-based functional metal layer comprises at least one dielectric layer having a stabilizing function immediately in contact with the blocking layer.

7. The glazing as claimed in claim 6, wherein the at least one dielectric layer having a stabilizing function immediately in contact with the blocking layer is based on zinc oxide, optionally doped using at least one other element.

8. The glazing as claimed in claim 1, wherein the thickness of a functional metal layer is between 5 and 20 nm.

9. The glazing as claimed in claim 1, wherein the antireflective coatings comprise at least one dielectric layer having a barrier function based on a silicon compound selected from the group consisting of silicon oxide, silicon nitride $Si_3N_4$ and silicon oxynitride $SiO_xN_y$, wherein the silicon compound is optionally doped using at least one other element.

10. The glazing as claimed in claim 9, wherein the silicon compound is $SiO_2$.

11. The glazing as claimed in claim 1, wherein the substrate coated with the stack has been subjected to a heat treatment at a temperature greater than 300° C.

12. The glazing as claimed in claim 11, wherein the substrate coated with the stack has been subjected to a heat treatment at a temperature greater than 500° C.

13. The glazing as claimed in claim 1, wherein at least the substrate coated with the stack is made of bent and/or tempered glass.

14. The glazing as claimed in claim 1, wherein the stack of thin layers is deposited on the substrate by cathode sputtering, optionally assisted by a magnetic field.

15. The glazing as claimed in claim 1, wherein the dielectric layer capable of generating defects of hole type exhibits a thickness between 8 and 20 nm.

16. The glazing as claimed in claim 1, wherein the thickness of the one or more layers interposed between the layer capable of generating defects of hole type and the functional layer is at most 15 nm.

* * * * *